Jan. 3, 1950     D. R. BUTTERLY     2,492,964
PHOTOELECTRIC MINIATURE RADIO RANGE
Filed April 23, 1945     4 Sheets-Sheet 1
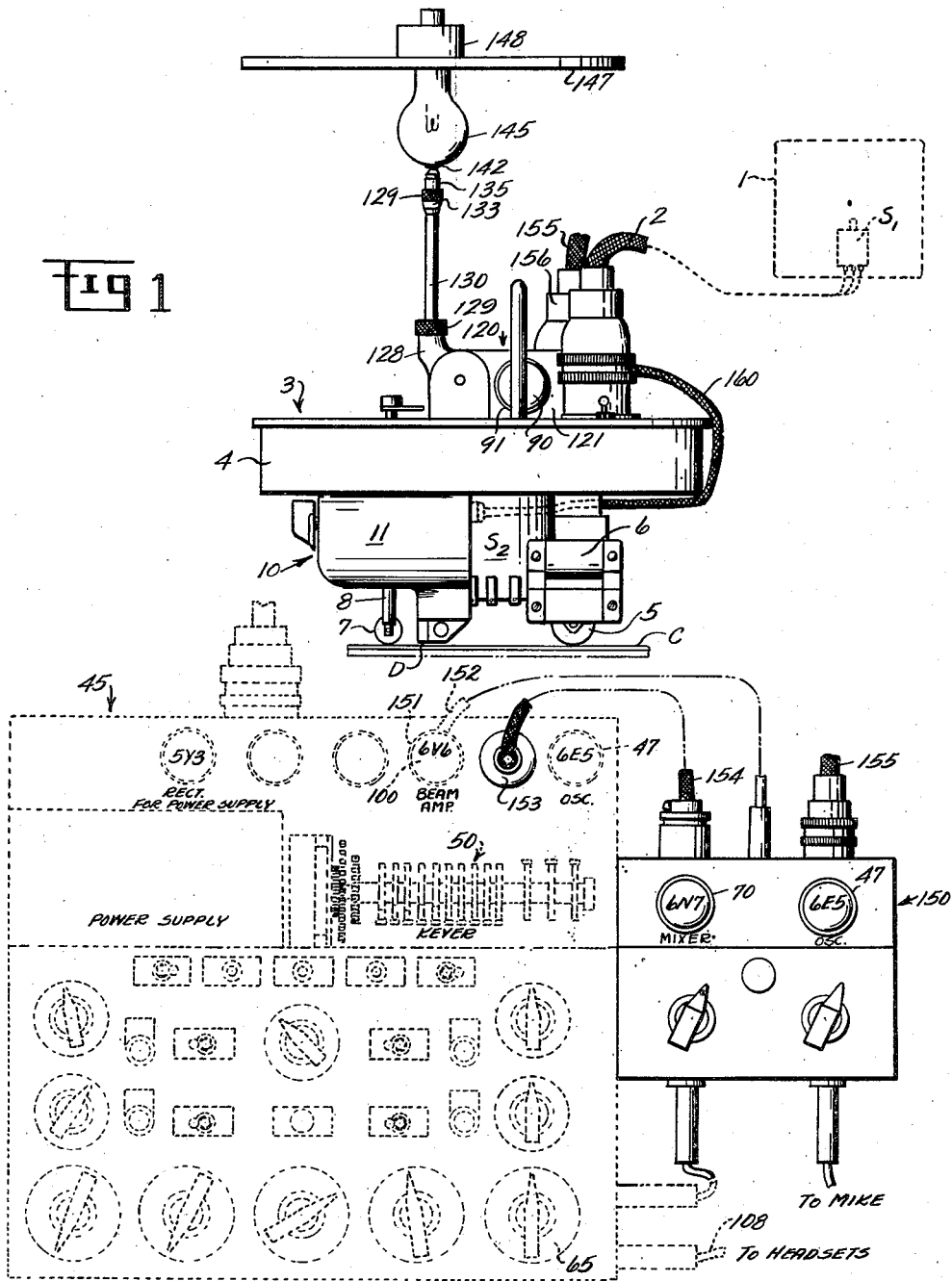
INVENTOR.
DANIEL R. BUTTERLY
BY
ATTORNEYS Jan. 3, 1950      D. R. BUTTERLY      2,492,964
PHOTOELECTRIC MINIATURE RADIO RANGE Filed April 23, 1945      4 Sheets-Sheet 2

INVENTOR.
DANIEL R. BUTTERLY
BY
ATTORNEYS

Jan. 3, 1950     D. R. BUTTERLY     2,492,964
PHOTOELECTRIC MINIATURE RADIO RANGE
Filed April 23, 1945     4 Sheets-Sheet 3
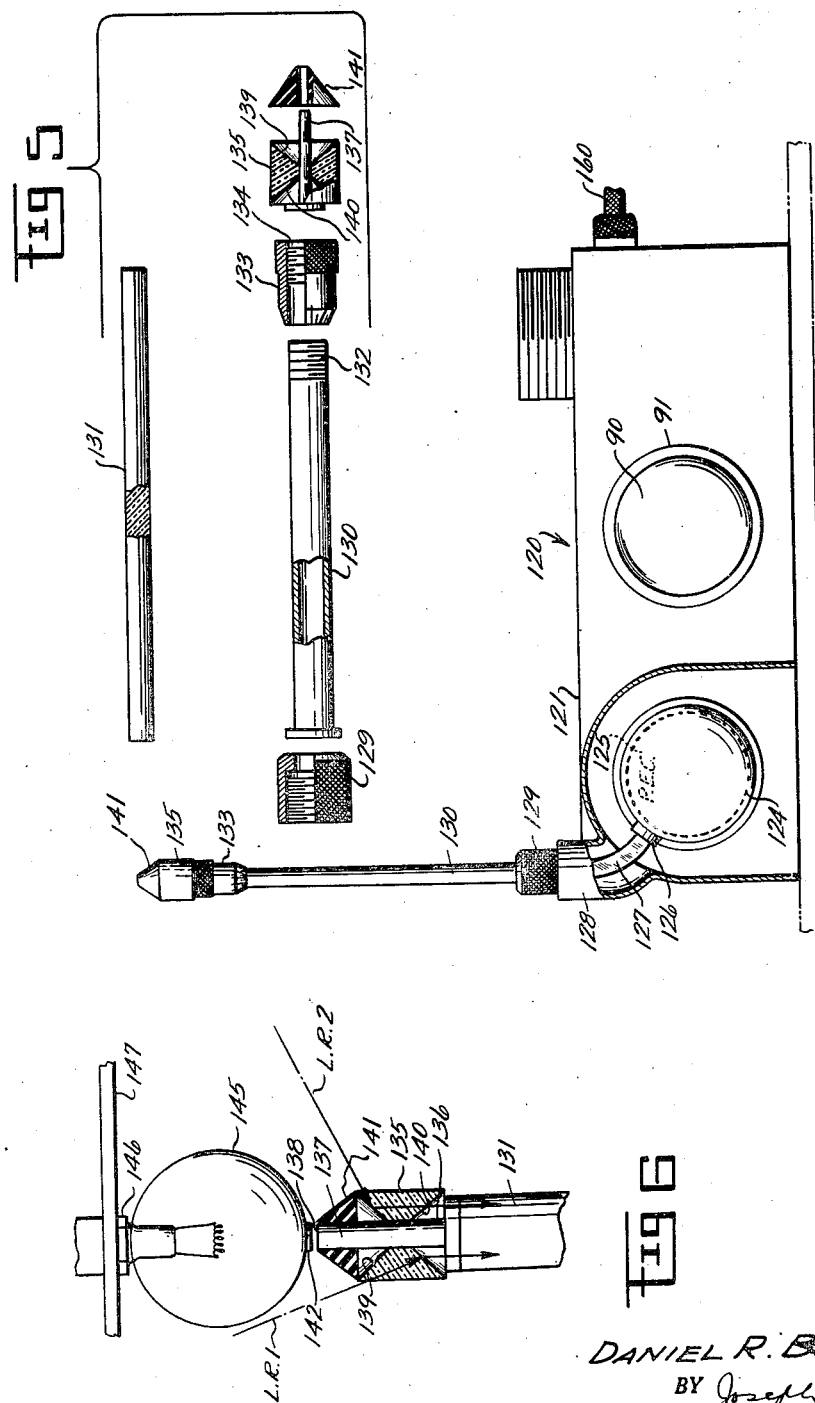
INVENTOR.
DANIEL R. BUTTERLY

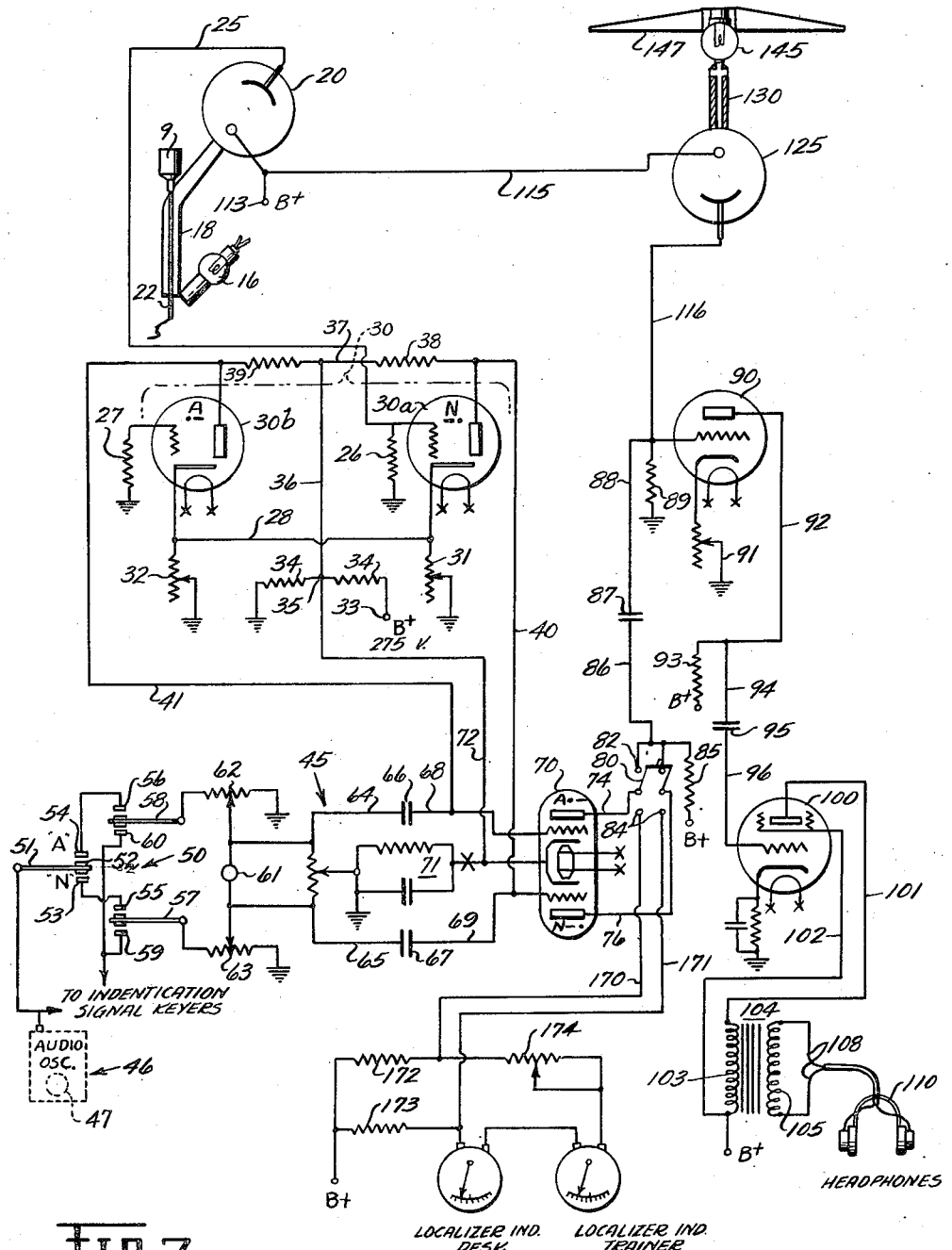

Patented Jan. 3, 1950

2,492,964

UNITED STATES PATENT OFFICE 2,492,964

PHOTOELECTRIC MINIATURE RADIO RANGE

Daniel R. Butterly, New York, N. Y.

Application April 23, 1945, Serial No. 589,833

9 Claims. (Cl. 35—10.2)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to miniature radio range apparatus for use in conjunction with aviation ground training equipment.

Aviation ground training devices currently in use employ a grounded trainer tiltable and rotatable about a fixed base and actuated by power means under the control of a student occupant to simulate the flight of an aircraft. The trainer is coupled to directionally control a course recorder by means of a self-synchronous electrical motion transmitting means, the recorder being movable over a chart at a speed proportional to the assumed air or ground speed of the trainer so that the recorder traces the assumed track of the trainer on the chart. By employing a chart having a radio range pattern thereon, the instructor may note the position of the recorder relative to the signal zones on the chart and, by manually actuating the control means of a signal generating device, give the student in the trainer the proper simulated radio range signal with a volume proportional to the observed distance of the recorder from the radio range station point on the chart.

Several methods of automatically giving radio range signals have been proposed and in use but in general require considerable equipment in addition to training equipment heretofore in use.

In accordance with the present invention, a special radio range chart is employed which is scanned by a photoelectric scanning device to derive a control current indicative of the character of signal required to indicate the position of the course recorder relative to the radio range signal zones. The scanning device is of a very simple character and capable of being mounted on a conventional course recorder without requiring alterations of the latter. The scanning device is electrically coupled to an electronic relay to selectively actuate the same, the relay being adapted to control a conventional signal generator to give the proper "A," "N" or On Course radio range signal as required. The scanning device and range chart are employed only for giving the proper "A" and "B" signals without respect to the radial position of the recorder with respect to the radio range station point on the chart, and this scanning system is referred to as the automatic beam-shift control system. To control signal volume, a second photoelectric control means is provided in which a lamp is positioned directly over the station point on the radio range chart. A small mask, equal to the desired scale diameter of the cone of silence, is affixed to the lamp and a reflector is employed to vary the intensity of illumination radially from the station axis. A light transmitting pickup is mounted on the recorder and is so constructed that, at a distance from the station axis, light is received horizontally by the pickup with the incidence angle changing as the recorder approaches the station point. When the pickup is coincident with the station point axis the light is cut off by the cone of silence mask. Light received by the pickup is transmitted to a photoelectric cell which is arranged in the grid circuit of the beam-shift signal amplifier so that the intensity of the transmitted range signals depends on the distance of the recorder marker from the simulated radio range station point on the chart.

Because a very large number of aviation ground trainers are in use having a manually manipulated radio range signal system which employs an audio-oscillator for generating a signal tone, a range signal keyer, a mixing or control stage, a signal amplifier and power supply, the present invention by means of simple adapters can utilize this signal system and furnish the necessary automatic control for the same at a very low cost.

The principal object of the present invention is the provision of a novel automatic radio range signal device for aviation ground trainers which can be readily adapted to existing equipment.

A further object of the invention is the provision of an automatic radio range signal device for aviation ground trainers employing a range signal chart, a photoelectric scanning device carried by the trainer course recorder and adapted to derive a signal control in accordance with the signal zone being scanned, the scanning device being adapted to control a signal generator and a second control means being provided to control signal volume in accordance with the radial distance of the course recorder from the point on the range chart correspondingly to the assumed radio range station.

It is another object of the invention to provide a novel radio range signal system for aviation ground trainers in which a photoelectric scanning device is adapted to cooperate with a special radio range chart to control the character of range signal given while a separate photoelectric device is employed for controlling signal volume.

It is a further object to provide in an automatic photoelectric radio range signal system of the character described, a novel scanning means incorporating a marker for leaving a trace at the central portion of each area successively scanned.

Another object of the invention is the provision of novel photoelectric means for controlling the signal volume in an automatic radio range signal system for aviation ground trainers.

Other objects and features of the invention will become apparent by reference to the detailed description hereinafter given and to the appended drawings, in which Fig. 1 illustrates the general arrangement of the elements constituting the invention, the manually actuated radio range signal device at present in use being shown in dotted lines;

Fig. 4 is a view partly in section illustrating the photoelectric signal volume control means;

Fig. 5 is an exploded view illustrating the details of the light pickup and transmitting structure of Fig. 4;

Fig. 6 is an enlarged view illustrating the manner of operation of the light pickup of Figs. 4 and 5; and Fig. 7 is a circuit diagram illustrating the electrical connections of the components of the assembly of Fig. 1.

Figure 3:
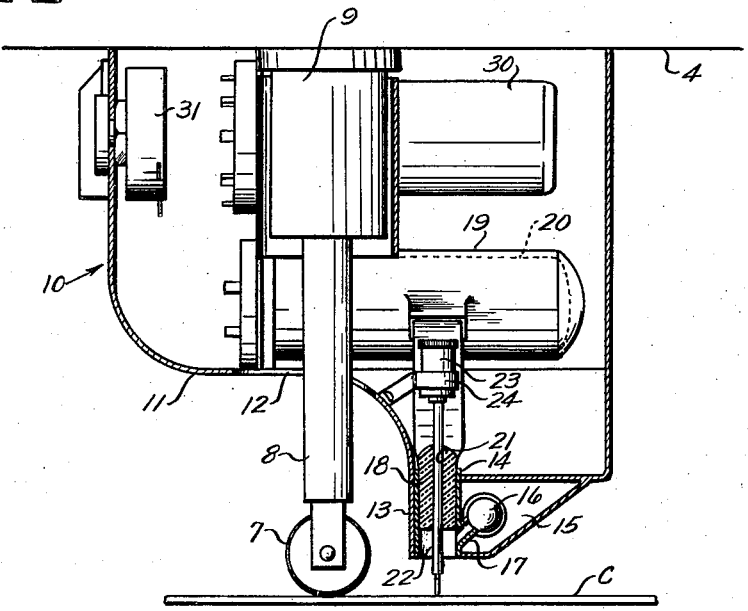
Fig. 3 is a view partly in section illustrating the detailed construction of the photoelectric scanning device for scanning the radio range signal chart and also illustrating the arrangement for making an ink record on the chart.

The general arrangement of the component parts of the invention as illustrated in Fig. 1 is seen to comprise an aviation ground training device 1, indicated by a blocked outline, which may be any type of device containing a control element for simulating control of an aircraft, one example being the well-known Link trainer. The trainer 1 includes a self-synchronous electrical transmitter unit $S_1$, the rotor of which is adapted to be controlled by the occupant of a trainer and electrically connected by means of a flexible cable 2 to a conventional course recorder generally indicated by the reference numeral 3. The course recorder 3 is provided with a self-synchronous electrical receiver $S_2$ actuated by the transmitter $S_1$ and adapted to directionally control the course recorder in a well-known manner. The course recorder is provided with a pair of steerable rollers 5 each adapted to be driven by an electric motor 6 at a speed proportional either to the assumed flight velocity, or ground speed of the trainer 1. The recorder is also provided with a forward steerable roller 7 mounted on a rotatable shaft 8, which in the usual construction is employed as a marker wheel, but in accordance with the present invention serves merely as a supporting roller, other marking means to be later described being provided.

The course recorder 3 is adapted to be propelled over the surface of a chart C in the form of a radio range chart having a radio range station point D marked thereon.

Figure 2:
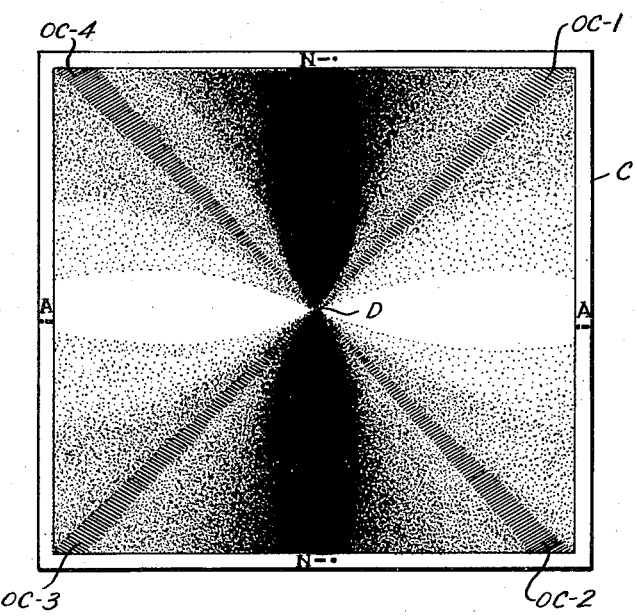
Fig. 2 is a top plan view of a typical radio range chart employed in conjunction with the apparatus of Fig. 1.

The chart C employed with the present invention is of a particular type such as illustrated in Fig. 2 which is divided into four signal quadrants, two being indicated as "N" signal zones and two as "A" signal zones, the signal zones of like character being spaced 180 degrees apart. The chart includes four range signal legs or On Course beams indicated respectively as OC—1 to OC—4.

The "N" signal zones each include an elliptical central portion of solid black which extend radially from point D, the radio range station point on the chart and the "N" zones gradually varying in density on each side of the solid black portions to the On Course signal legs which have a density of fifty percent; that is half white and half black. Similarly, the "A" signal zones vary from elliptical central sections of solid white by varying density zones until the On Course signal zones are reached. There is substantially no variation in density radially from station point D on any substantially radial line, but on any circle drawn with station point D as a center there will be a variation from solid white gradually along the circumference of the circle to fifty percent density on an On Course signal leg with increasing density until the solid black of an adjacent "N" signal zone is reached, and a similar variation will occur in the remaining two gradrants of the chart. It is apparent that if a concentrated beam of light of small area is projected onto the solid black portion of an "N" signal zone, very little light will be reflected from this zone, while in the solid white area of an "A" signal zone a maximum of light would be reflected. In the On Course signal leg zones half the amount of light reflected from a solid white signal zone would be received by a scanning device. If then a photoelectric scanning device capable of scanning a small area by light reflected from the chart is traversed over the chart, the maximum current would be passed or generated when the scanning device was on a solid white portion of an "A" signal zone and would generate a minimum control signal when in a solid black portion of the "N" signal zones with a corresponding variation in signal current on any circumferential zone traversed between a pair of adjacent signal zones. If the scanning device is moved on a radial line there will be substantially no change in current or control signal in moving radially outward from point D. The chart C is purposely made with no substantial radial variation in density because of the extreme difficulty, if not impossibility, of duplicating a chart having density variations both in a radial and circumferential direction. The present chart may be made with any desired angle between On Course signal legs by dividing any signal zone into small zones in the shape of sectors for which a Ben Day screen number can be assigned, corresponding to a certain density of black dots per square inch. By suitably arranging the number of small sectors, the proper variation from an On Course signal zone to solid black and to solid white on either side thereof may be adjusted, and from such a chart specification a commercial lithographer can readily construct and reproduce any desired number of charts. The number of separate charts required will, of course, depend upon the number of radio ranges to be duplicated, but once the original is made any number of duplicate charts may be printed at a cost only slightly in excess of that of the present type of chart now employed on manually controlled radio range devices for ground trainers.

Referring again to Fig. 1, a photoelectric scanning device, generally indicated by the reference numeral 10 and inclosed in a housing 11, is so constructed as to be capable of being mounted on a conventional course recorder without requiring any structural changes in the latter, and this scanning device will scan a chart of the character as shown in Fig. 2 to determine, in accordance with the position of the course recorder on the chart, the type of radio range signal to be transmitted to the training device.

The scanning device 10 is shown in Fig. 3 as comprising a housing 11 provided with an aperture 12 whereby the housing and its contents may be slipped over the roller 7 and the roller shaft 8 and bearing 9 to be secured to the course recorder frame 4 by means of screws or the like, not shown. The housing 11 has a downwardly depending portion 13 into which is secured a tubular member 14 which is open at its lower end to receive light reflected upward from the chart C. The depending portion 13 of housing 11 is provided with a lamp chamber 15 in which is positioned a small electric lamp 16 which is adapted to direct light through a tubular member 17 and through the open end of the tubular support 14 to be directed on the chart, thus serving as means for illuminating the area to be scanned. A transparent light conductor 18 is inserted into the support 14 so that light reflected upward from the area to be scanned passes therethrough and is conducted through an electrostatic shield 19 to a photoelectric cell 20 to impinge on the light sensitive elements thereof. The electrostatic shield 19 and photoelectric cell 20 are suitably supported by means of a socket structure within the housing 11 which also serves as a support for a double triode vacuum tube 30 comprising two separate vacuum tubes 30a and 30b in a single envelope and also for adjustable cathode resistors 31 and 32, only one of which is shown in Fig. 3. Other circuit components such as resistors, conductors, electrical connections, and the like, not shown, associated with the photoelectric cell 20 and dual triode vacuum tube 30, are positioned within the housing 11 but not shown.

The light conducting rod 18 has its upper end laterally bent to extend into the electrostatic shield 19 of the photoelectric cell and is provided with a central bore or aperture 21 in the portion thereof positioned within the tubular support 14, through which aperture a hollow tube or needle 22 extends downwardly to contact the surface of the chart C, serving as a marker or pen to indicate on the chart the trace of the movement of the course recorder 3. The marker tube or pen 21 is preferably made of hypodermic needle tubing and is connected at its upper end to a small refillable ink reservoir 23 which is slidably supported in a guide 24 and adapted to be raised and lowered by means, not shown, from externally of the housing 11 to bring the marker out of, or into contact with, the chart C. Electrical conductor 160 serves to make all the necessary electrical connections between the scanning unit and the other electrical elements of the invention.

The photoelectric scanning device 10 is adapted to cooperate with a conventional radio range signal generating device indicated by the reference numeral 45 in Fig. 1 and shown in phantom outline, such a signal device itself being well known in the art and including a power supply, an audio oscillator, the tube of which is indicated at 47, an automatic keyer indicated by a reference numeral 50, an amplifying control or mixer 70 and final amplifier 100. The arrangement of the radio range signaling device 45 as known in the art is such that a continuous audio signal is automatically keyed to give the conventional "A" and "N" radio range signals, which signals are adapted to be passed in accordance with a manually actuated control to the control section or mixer and after further amplification transmitted to the headphones worn by the occupant of the trainer. In the use of the prior art signalling device, the instructor formerly watched the position of the marker wheel of the course recorder with respect to the radio range chart and manually actuated the signal control potentiometer to give the proper type of signal and the required signal volume. In accordance with the present invention, the scanning device 10 is so correlated to the circuits of the conventional radio range signal generator 45, by means of a simple adapter device, that the scanning device controls the type of signal to be given automatically without requiring the intervention of an instructor, and a separate photoelectric volume-controlled means, generally indicated by the reference numeral 120, is provided for varying the signal volume in accordance with the radial distance of the course recorder from the axis of the radio range station point D on the chart C. This arrangement provides full automatic control but the signal generator manual control can be employed at any time desired.

The automatic volume control or build-fade control, as generally indicated in Fig. 4 by reference numeral 120, comprises a housing 121 which serves as a support for vacuum type control tube 90 mounted by means of a suitable socket on the housing as indicated at 91. The housing 121 also incloses a conventional electrostatic shield 124 for a photoelectric cell 125 positioned therein and which is suitably electrically connected to the tube 90 by means not shown. Electrostatic shield 124 is provided with a tubular aperture 126 into which a curved light conducting rod 127 extends to transmit light to the photoelectric cell for control purposes, the rod 127 being positioned and supported by a vertically extending tubular housing 128 which is suitably threaded at its upper end to provide a mounting for a nut 129 for a light pickup assembly. The details of the pickup are also indicated in Fig. 5 as including a vertical tubular housing 133 having a recess 134 therein adapted to receive and support a light-transmitting pickup 135, made of "Lucite" or similar material, on top of which a mask 141 made of light impervious material is positioned.

As seen in Fig. 6, the light pickup 135, generally of a cylindrical shape, has a central cylindrical portion 136 adapted to directly contact the upper end of the light conducting rod 131 and has a similar cylindrical extension 137 adapted to receive external light from a direct pickup face 138 and transmit the same downward by internal reflection to the light pickup rod 131 which transmits the light onward to the photoelectric cell 125. The pickup 135 is provided with a conical recess or bore at its upper end as indicated at 139, the face of which is highly polished to serve as a reflecting surface. A similar conical depression is formed at the lower end of the pickup as indicated at 140 and the surface of which is sand blasted or otherwise suitably treated to form a diffusing or light-absorbing surface. A mask 141 is positioned on the cylindrical extension 137 and masks any but nearly direct rays of light from passing downward through the extension 137. The light pickup face 138 is adapted to cooperate with a mask of equal diameter 142 positioned on the bottom of a lamp 145 which is suitably secured in a socket 146 and provided with a reflector 147. The lamp assembly is adapted to be supported in the manner indicated in Fig. 1 so that a vertical axis through the lamp passes through the station point D on the radio range chart.

By reference to Fig. 1, it is seen that the volume control assembly 120 and light pickup 135 being mounted on the recorder are movable therewith relative to the lamp 145 which is stationary. The arrangement of the reflector 147 is such that the illumination varies radially outward from the axis of the station point on the radio range chart in a manner to give a variation in control signal simulating the variation in signal volume with distance from the radio range station experienced in actual practice. Referring to Fig. 1, taken in conjunction with Fig. 6, it is seen that as the recorder is positioned so that the light pickup face 138 is immediately beneath the mask 142 on lamp 145, no light can be directly transmitted downward to the pickup, and hence the current passed by the photoelectric cell will be a minimum, and in conjunction with the control circuit provides for complete range signal cutoff to simulate the cone of silence. As the recorder and light pickup 135 moves outward from the radio range station point D on the chart Fig. 1, light from the lamp 145 will be transmitted from the pickup face 138 directly downward through the cylindrical portions 135 and 136 to the light transmitting rod 131 and to the photoelectric cell 125, Fig. 4, so that a maximum of light will be received by the photoelectric cell 125, causing a rapid build-up in volume of the transmitted radio range signal. The light pickup face 138 is effective to receive downwardly directed light from the lamp 145 for a distance of about three-quarters of an inch radially outward from the vertical axis passing through the lamp, after which time it becomes ineffective. Light will then be received from the reflector 147 along lines somewhat as indicated by the arrow $LR_1$, Fig. 6, and this light will strike the diffusing surface 140 and will illuminate the light conducting rod 131 and be transmitted downward to the photoelectric cell in the same manner as previously described. The intensity of light will continually diminish with increasing distance of the recorder and pickup from the axis of the radio range station point on the chart until finally the surface 140 will become ineffective to receive light, at which time light rays will be received by the pickup in a more nearly horizontal direction as indicated by light ray $LR_2$ which will strike the highly polished conical surface 139 to be reflected downward, as indicated by the arrow, into the light conducting rod 131. As the light rays impinge on the pickup in a more nearly horizontal direction, the reflecting surface 139 is effective to transmit substantially all of the light received to the pickup rod 131. The above described construction provides for a smooth transition in light pickup as the course recorder moves towards or away from the radio range station point on the chart, and the arrangement whereby light may be received anywhere from the horizontal to the vertical and still pass into the light conducting rod 131 for transmission to the photoelectric cell for control purposes is believed to be a novel feature of the invention. Although radio range signals vary inversely with the square of the distance from the radio range signal, the best results have been achieved with the present invention in having the light intensity to vary nearly linearly with distance from the radio range station point, and by suitably designing the amplifier characteristics, the radio range signal volume will increase from zero within the cone of silence very steeply to a maximum and then fall off nearly parabolically to the minimum signal at a distance of from one-and-a-half to two feet radially outward from the radio range station point on the chart. The principle of volume control of a radio range signal however may be extended for use with larger charts if so desired. The principle of a separate control of radio range signal volume, independent of the means for controlling the character of signal, overcomes many of the objections to the use of photoelectric control devices for miniature radio range work, and this is believed to constitute a distinct point of novelty in the invention.

Referring again to Fig. 1, it was previously stated that the conventional radio signal chassis now widely used in conjunction with aviation ground trainers was employed as a part of the present invention, such prior art signal device being as noted indicated by the reference character 45. In order to adapt the present automatic control to the previous manually controlled device, a separate adapter chassis, generally indicated by the reference numeral 150, is employed and an adapter socket is provided for insertion in the amplifier tube socket to provide a suitable B+ voltage supply for operation of the automatic control and, being connected to the chassis 150 by means of a cable conductor 152. The mixer tube 70 is removed from the chassis 45 and inserted in the adapter chassis 150 and a plug 153 and conductor 154 serve to connect the circuit elements to the adaptor. The audio oscillator section including tube 47 of the radio signal chassis 45 is rendered dead by means of the break-in plug connection 153 and hence is duplicated in the adapter chassis 150, the tube 47 being transferred thereto after removal from the chassis 45. Suitable plug connections provide for interphone speech connection between the adapter chassis 150 and the signal chassis 45 so that the interphone communication and signal output sections of the radio signal chassis are utilized. A suitable multiconductor flexible cable 155 connects the photoelectric scanning device 10 and volume control 120 to the adapter and the signal circuit, units 10 and 120 being interconnected with each other by means of shielded cable 160. All of the cables interconnecting the course recorder and the adapter chassis, as well as the connections from the latter to the radio signal chassis, are inclosed within grounded shields and the two chassis are connected to a common ground.

By means of the adapter chassis above described, which also includes control switches and the like, not shown, the control system in accordance with the present invention may be readily connected to conventional dummy radio range signal transmitting devices without requiring any structural change in the latter and may be left thereafter as a permanent assembly, switching means being provided for changing the circuit connections back for manual operation at any time desired. This feature permits the large number of manually actuated radio range signal devices now in use in conjunction with aviation ground training equipment to be converted for automatic operation without scrapping any part of the equipment or requiring any alteration therein other than the plugging in of the adapter chassis and the transfer of two vacuum tubes from the radio range signal chassis to the adaptor chassis. This feature permits the added equipment, which is inexpensive to be utilized with existing equipment at a minimum of cost.

The circuit arrangement of the novel control system in accordance with the present invention, in conjunction with the essential elements of the prior art, radio range signal device to provide full automatic operation, as illustrated in Fig. 7, will now be described.

By reference to Fig. 7, it is seen that the photoelectric cell 20 has its cathode connected by means of a conductor 25 to the grid of a triode type vacuum tube 30a forming one part of a dual-triode tube, generally indicated by the reference numeral 30, and separately indicated merely for purposes of clarity of illustration. The grid of the tube 30a is also connected by means of a grid resistor 26 to ground which forms the return side of the various power circuits. A similar triode vacuum tube unit 30b also forming an integral part of the tube 30 has its grid connected to ground by means of a resistor 27. The cathodes of the tubes 30a and 30b are connected in parallel by means of conductor 28. The cathode of tube 30a is also connected to an adjustable cathode resistor 31 and from thence to ground and a similar adjustable cathode resistor 32 connects the cathode of tube 30b to ground. A suitable high voltage direct current or B+ connection 33 having a voltage of approximately 275 volts is connected by means of voltage-dividing resistors 34 to ground and having the midpoint 35 of the voltage divider connected by means of conductor 36 to a conductor 37 which connects the inner ends of a pair of load resistors 38 and 39 respectively arranged in the plate circuits of tubes 30a and 30b. An output conductor 40 is connected to the plate circuit of tube 30a while a similar output conductor 41 is connected to the plate circuit of tube 30b, the voltages in these conductors being utilized for control purposes in a manner which will hereinafter be described.

The radio range signal chassis, generally indicated by the reference numeral 45, includes an audio-oscillator unit 46 having a vacuum tube 47 therein which is operative to generate a continuous audible tone and the oscillator output being conducted to an automatic keyer device, generally indicated by the reference numeral 50. The keyer 50 includes a cam actuated switch arm 51 having a contact 52 thereon which is adapted to engage a lower contact 53 to produce keyed "N" signals or to engage an upper contact 54 to produce keyed "A" signals. The cam (not shown) for actuating the switch arm 51 of a well-known type such as disclosed in Melvin et al. U. S. Patent No. 2,352,216, is so constructed as to provide an interlock between the "N" and "A" signals so that the dots of the "N" and "A" signals occur sequentially, and if the signals are amplified and transmitted to headphones with substantially the same volume they will be heard in the headphones as a continuous audible tone exactly similar to On-Course radio range signals. The cam actuated switch contacts 53 and 54 are actually adjustably spring mounted, and may be manually adjusted to provide no time lag between the completion of the "N" and the beginning of the "A" signals, which further enhances the aural perception of a continuous tone when these signals are heard with substantially the same volume. The contacts 53 and 54 respectively connect to contacts 55 and 56 of a cam actuated switching device, which includes switch arms 57 and 58 and lower contacts 59 and 60. When the switch arms 57 and 58 engage contacts 55 and 56, the keyed "A" and "N" signals are adapted to be transmitted onward while when the switch arms engage either contacts 59 and 60, the "A" and "N" signal keyer is cut out and the amplifier section is connected to receive identification keyed signals by means of further cam actuated keying devices, not shown. The switch arms 57 and 58 are connected to potentiometers 62 and 63 which are actuated by common control knob 61, which by manual actuation determines the type of signal to be transmitted and its relative volume. The potentiometers 62 and 63 are connected by means of output leads 64 and 65 which in the prior art devices are led directly to the grids of an amplifier and mixer tube, but in the case of the present invention are broken by means of the adapter circuits for the insertion of blocking condensers 66 and 67 therein which are connected by means of conductors 68 and 69 to the respective grids of a double triode vacuum tube 70, employed as a mixer tube. The cathode resistor unit 71 employed in the manually controlled device is isolated by breaking the connection as indicated at X and the conductor 72 connecting the cathodes of the tube 70 to the tapping point 35 of the voltage dividing resistances 34 so as to provide a cathode return circuit. The circuit so far described, with the exception of the blocking condensers 66 and 67, is already old and well known in the prior art.

The grid leads 68 and 69 of the tube 70 are respectively connected to the conductors 41 and 40 of the photoelectric signal control device of the present invention. The type of signal passed on to the grids of the control tube 70 is thus made dependent upon the grid control voltage appearing in the conductors 40 and 41, which voltages are in turn controlled by the photoelectric cell 20 in accordance with the relative intensity of light reflected from the chart to the scanning device described with reference to Fig. 3.

The plates of the mixer tube 70 are connected by means of conductors 74 and 76 to the plates of a double-pole, double-throw switch 80 which has a pair of upper contacts 82 and a pair of lower contacts 84. When the switch blades 80 engage contacts 82, the plates of the mixer or control tube 70 are connected in parallel and by means of a resistor 85 to the B+ voltage supply. By means of conductor 86, blocking condenser 87, and conductor 88 the plates are also connected to the grid of the volume control tube 90 associated with photoelectric cell 125 and described with reference to Fig. 4. The grid of tube 90 is connected to ground by means of a grid resistance 89 and the cathode of tube 90 is connected by means of an adjustable cathode resistance 91 to ground. The plate of tube 90 is connected by means of conductor 92 to a load resistor 93 which in turn is connected to the B+ direct current supply. Conductor 92 is also connected by means of conductor 94 blocking condenser 95 and conductor 96 to the grid of a final amplifier tube 100, a part of the prior art signal control device. The output circuit of tube 100 is connected by means of conductors 101 and 102 to the primary coil 103 of a coupling transformer 104, the primary 103 also being connected to the B+ or plate voltage supply. The secondary 105 of the transformer 104 is connected by means of conductors 108 to sets of headphones 110 worn respectively by the instructor and student receiving training. The photoelectric cells 20 and 125 have their anodes connected to a suitable source of operating voltage indicated at 113 by means of a conductor 115, and a conductor 116 serves to connect the cathode of photoelectric cell 125 to the grid of vacuum tube 90.

When the double-pole, double-control switch 80 is thrown so that the switch plates contact the lower contact 84, the plates of vacuum tube 70 are respectively connected to conductors 170 and 171 which in turn are connected to a voltage bridge, one pair of arms of which include resistors 172 and 173 and the other arms of which include an adjustable resistor 174 and a pair of series connected localizer indicators such as now employed with the manually operated radio range device for simulation of blind landings. By means of these indicators the signals appearing in plate circuits of tube 70 will indicate deviation of the course recorder to the right or left of a localizer beam pattern drawn on a landing chart in a manner similar to one On Course signal leg and adjacent signal zones of a radio range pattern. This mechanism thereby permits the use of the radio range equipment to give an automatic visual indication of the movement of the course recorder with respect to a signal pattern on a chare.

*Operation*

In consideration of the automatic radio range in accordance with the present invention, for a more clear understanding the operation of the beam-shift or signal control will be first described without reference to the volume or fade-build control system, or in other words, the movement of the recorder over the chart C of Fig. 2 will be presumed to be on the periphery of a circle concentric with the radio range station point D on the chart and the control inclosed by the photoelectric cell 125, Fig. 7, will be assumed to be in constant and therefore not affecting signal volume.

*Beam-shift control system*

If the course recorder 3 of Fig. 1 is assumed to be moving on the periphery of a circular path on chart C concentric with the radio range station point D on the chart and the recorder enters or moves radially outward along an On Course signal leg on chart C and light reflected from the chart surface is transmitted to the P. E. cell 20, the amount of light received by cell 20 will remain constant and the voltage on the grid of amplifier tube 30a will remain constant and the currents in the plate circuits of tubes 30a and 30b will remain equal or in a predetermined ratio depending on the adjustment of the cathode resistances 31 and 32 associated with tubes. The grid potential on the grids of tube 70 will then be equal or in a predetermined voltage ratio and both "N" and "A" signals developed by the signal keyer 50 will be sequentially passed by tube 70 and amplified by tube 100 for transmission to the headphones. So long as the "A" and "N" signal volumes are substantially equal, the interlock between the "N" and "A" signals, as previously explained, will give rise to the aural impression of a substantially continuous tone or On-Course signal identical to the On-Course signal received on an actual radio range. The phenomena of a continuous tone disappear upon variation in the relative strength of the "A" and "N" signals, which is indicative of departure from an On-Course signal zone.

If the recorder moves from an On Signal leg into an "A" signal zone on the chart, the quantity of light received by P. E. cell 20 will increase, causing a corresponding increase of potential on the grid of tube 30a rendering the same more positive with respect to the cathode and causing an increase in the current flow in the plate circuit of the tube. The increase in plate current in the plate circuit of tube unit 30a will cause an increase in voltage drop across load resistor 38 which will make the plate side of the resistor more negative; and, since this is connected by conductor 40 to the "N" grid of tube 70, this grid becomes more negative and the "N" signal decreases in volume.

Meanwhile the increased plate current in tube 30a which goes through the cathode resistor 31 causes an increase in the voltage drop across the resistor, and, since the cathodes of tubes 30a and 30b are connected together, the cathode of tube 30b is made more positive with respect to the grid of tube 30b, causing the current in the plate circuit of tube 30b to drop. This drop in plate current through plate load resistance 39 decreases the negative potential on the plate side of this resistor and likewise the negative potential of the grid of the "A" unit of tube 70, since the plate of tube 30b is connected to this grid by conductor 41. The rendering of the grid of the "A" signal unit of tube 12 more positive causes the "A" signal volume transmitted to the headphones to increase.

As the recorder moves further into the "A" signal zone along a constant radius the "N" signal will continue to decrease while "A" signal will rise until a maximum is reached when the recorder scanning device reaches a solid white zone. As the grid potential on the "N" signal unit of tube 70 becomes more negative a point is reached where the tube's plate current will cut off, causing the "N" signal to cease while the "A" signal will continue to build up to a maximum. The "N" signal will cut off in the "A" signal zone at a point approximately midway between an On Course signal leg and the solid white portion of the signal zone, but the point of cut-off can be adjusted to suit the particular range desired.

If the recorder is moving on a circular arc concentric with the range station point D on the chart C from an On Course signal leg into an "N" signal zone, the amount of light reflected from the chart and received by the photoelectric cell 20 will decrease causing the grid of tube 30a to become more negative. As the grid of tube 30a becomes more negative, the current in the associated plate circuit will drop making the plate side of resistor 38 become more positive which will in turn cause the "N" signal grid of tube 70 to become more positive so that the volume of the "N" signal will increase.

The decrease in plate current of tube 30a will cause a decrease in voltage drop across the cathode resistor 31 so that the cathode of tube 30b becomes more negative with respect to the grid of tube 30b, causing an increase in the current in the plate circuit and an increase in the voltage drop across resistor 39 and increases the negative potential of the plate end of the resistor which causes the grid of the "A" signal unit of tube 70 to become more negative so that the volume of the "A" signal transmitted onto the headphones decreases. The "A" signal will continue to decrease until the cut-off point of tube 30b is reached when the "A" signal will cease while the "N" signal volume will increase until a maximum is reached when the scanning means 10 on the recorder is directly over the solid black area of the "N" signal zone.

It is thus seen that the automatic beam-shift control will, in cooperation with a chart of the character described, give a signal of the particular character called for by the relative position of the course recorder and the signal zones on the chart. The device will work in a similar manner with a chart representing a runway localizer beam which will have the beam shaded similar to one of the On Course signal legs of the chart of Fig. 2 and a pattern of increasing density on one side and of decreasing density on the opposite side of the localizer beam so that when employed with the signal generator an aural signal such as "A" and "N" or "E" and "T" or continuous On Course signal will be received or the signal generator output used to actuate a left-right indicator.

*Operation of fade-build or signal volume control*

In order to cause the "A," "N," or On Course signal to vary in accordance with distance from the range station point D on the chart (see Figs. 1 and 2) the lamp 145 (Figs. 1 and 6) is positioned directly above the range station point on the chart and cooperates with the reflector 147 to give a light flux variation with respect to radial distance from the station point. The pickup 135 as previously described is operative to transmit light received from the field of illumination and transmit the same to the photoelectric cell 125 in accordance with the radial position of the pickup from the axis of the radio range station point of the chart and the current passing in the circuit including the photoelectric cell 25 will then vary in accordance with the distance of the recorder from the radio range station point axis. This current variation is utilized to effect the signal volume control in the circuit arrangement of Fig. 7 in a manner now to be described.

If the course recorder is assumed to be moving radially inward towards the axis of the radio range station point, the intensity of light received by a photoelectric cell 125 will increase so that the voltage on the grid of the amplifier tube 90, Fig. 7, will be such that the grid becomes more positive; and hence the current in the plate circuit of the tube will increase to thereby bias the output of the final amplifier tube 100 and increase the signal volume in the headphones 110. Similarly, the light received by the photoelectric cell 125 will decrease as the recorder moves radially outward from the radio range station point D on the chart so that the grid of amplifier tube 90 becomes more negative and the strength of signals passed to the final amplifier tube 100 will be diminished causing a decrease in signal volume in the headphones 110.

When the pickup 135 is directly under the lamp the pickup face 138, Fig. 6 which is the only portion effective to transmit light, will be masked by the masking shield 142 on the lamp so that the current in the photoelectric cell circuit will suddenly drop causing the grid of amplifier tube 90 to become sufficiently negative so that the tube is biased substantially to cutoff and no signal will be transmitted to the final amplifier stage. As soon, however, as the pickup face 138 moves away from the mask 142 the high intensity light directly transmitted therethrough from the lamp will cause the photoelectric cell 125 to pass the maximum of current causing the grid of tube 90 to become more positive to pass a signal with a maximum volume. Since it is thus apparent that as the course recorder moves radially inward or outward along any path on the radio range chart, the signal volume will be controlled in accordance with the distance of the recorder from the radio range station axis, while if the recorder is moving on a circumferential path, the signal character and signal volume will then be solely controlled by the beam-shift control system, since then the effect of the photoelectric cell 125 will remain constant.

The fade-build control system will operate in a manner identical to that above described when employed with a runway localizer beam chart using aural signals and hence need not be separately described.

*Operation of localizer visual indicating system*

If the double-pole, double-throw switch 80 is thrown so that the blades thereof contact the contacts 84, Fig. 7, the beam-shift control system is connected by means of the conductors 170 and 171 to the localizer indicators. By means of these connections the plates of the "A" and "N" signal portions of tube 70 are separately connected to the voltage bridge arrangement so long as the recorder moves on the localizer beam On Course signal leg the voltages applied from the "A" and "N" signal plates respectively will be equal, and hence the pointers of the indicators will remain in the mid position. If, however, the course recorder moves to the right or left of the On Course signal leg on the chart the plate current in the "A" and "N" signal sections of the tube 70 will vary in accordance with the sense and magnitude of the departure, and the localizer indicator will accordingly move from the neutral position in a direction and amount proportional to the departure. Accordingly the device may be employed for automatic indication on a localizer beam chart in lieu of manual operation as now employed for actuation of these indicators.

Although a preferred form of the invention has been illustrated and described, many variations and changes therein will be apparent to those skilled in the art as falling within the scope of the invention as defined in the appended claims.

I claim:

1. A photoelectric device for simulating a radio range for use in conjunction with aviation ground training equipment comprising a chart having a radio range signal field depicted thereon with the signal zones thereof varying in light absorbing properties laterally from a median value on the On Course signal legs but having light absorbing properties along radial lines through said zones substantially constant, a course indicator adapted to be propelled over the surface of the chart at a velocity proportional to the assumed velocity of an aircraft and remotely directionally controlled by the student to simulate the flight course of the assumed aircraft, a signal generator adapted to generate radio range signals of varying character, a control means for said signal generator including, a photoelectric scanning device mounted on the course indicator and including a means for illuminating a small area of the chart, a light pickup to receive light reflected from the illuminated area of the chart, a photoelectric cell operatively associated with said light pickup, a control circuit operatively associated with said photoelectric cell and connected to said signal generator means to control the character of signal generated by said signal generator and separate means responsive to radial movement of the course indicator with respect to a radio station point on the chart to control the volume of signals emitted by said signal generator in accordance with the assumed distance from the radio station.

2. In a device for simulating radio range signals for use in instructing a student in the art of aerial navigation, a chart having an On Course signal beam depicted thereon with a predetermined value of light reflection properties and signal zones lying on opposite sides of said beam depicted on said chart and one zone having increasing light reflecting properties with increase in lateral departure from the beam and the other signal zone decreasing in light reflecting properties with increase in lateral departure from said beam, the reflecting properties along radial lines through said zones being substantially constant, a means movable over the surface of the chart at a velocity proportional to the velocity of an assumed aircraft and remotely directionally controlled by the student, a source of light carried on said movable means for illuminating a small area of said chart, a light transmitting pickup and a photoelectric cell mounted on said movable means for receiving light reflected from the illuminated area of the chart, a control electric circuit operatively associated with said photoelectric cell, a signal generator for selectively emitting positional signals indicative of the zonal position of said pickup with respect to said chart and a connection between said control circuit and said signal generator whereby the output of said signal generator is selectively controlled by said photoelectric cell through said control circuit and separate control means responsive to radial movement of the course indicator with respect to a radio station point on the chart for controlling the volume of signal emitted by said signal generator in accordance with the assumed distance from the radio station.

3. The structure as claimed in claim 1, in which the means for automatically varying the volume of signals transmitted from said signal generator in accordance with the radial distance of the course indicator from an assumed radio station point on the chart comprises a second source of light positioned coaxial with the assumed radio station point on the chart and radiating light over the chart, a separate light pickup and photoelectric cell mounted on said course indicator and cooperating with said second source of light, and an electrical control circuit connected to said photoelectric cell and to said signal generator for controlling the volume of signals emitted thereby.

4. In a radio range simulating device of the character described, a chart having a radio range pattern depicted thereon with the signal zones thereof varying in light reflecting properties, a course indicator adapted to be propelled over the surface of the chart to simulate the assumed flight course of an aircraft, a means carried by said course indicator for illuminating a small local area of the chart beneath the course indicator, a photoelectric scanning means carried by said course indicator and operative in response to reflected light received from the illuminated area of the chart, a signal generating means for generating positional indicating signals, a selective control means operatively associated with said signal generator and actuated by said photoelectric scanning means to control the character of signals transmitted to a signal receiving means, a stationary light source positioned concentric with the axis of a radio station point on the chart, a light pickup mounted on said course indicator concentric with said scanning means and cooperating with said stationary light source, a photoelectric cell mounted on said course indicator and adapted to receive light from said pickup and volume control means controlled by said photoelectric cell and connected to said signal generator to control the signal volume in accordance with the radial distance of said pickup from the stationary light source.

5. Apparatus as claimed in claim 4, in which said stationary light source comprises a lamp having a masked portion thereon concentric with the axis of the radio station point on the chart, said masked portion being effective to prevent transmission of light from the lamp to the pickup when the latter is positioned substantially over the radio station point on the chart.

6. In a radio range simulating device of the character described a signal generating device including an audio-oscillator sequentially keyed to give radio range or equivalent position identifying signals, a vacuum tube control selectively operative to determine the character and volume of the respective signals emitted, a photoelectric cell in circuit with said control and variation in current therethrough above or below a median value causing said vacuum tube control to effect an increase or decrease in volume of one signal with respect to the other respectively, a chart having at least one zone of constant light reflecting characteristics thereon and zones extending laterally therefrom, one having decreasing light reflecting characteristics and the other having increasing light reflecting characteristics which decrease and increase, respectively in lateral departure from the constant reflection zone, a means for illuminating a small area of the chart and a light pickup for transmitting light reflected from the illuminated area of the chart to said photoelectric cell and means for moving said pickup and said photoelectric cell as a unit relative to the surface of said chart.

7. The structure as defined in claim 1, in which the separate control means responsive to movement of the course indicator for controlling signal volume comprises a stationary light source radiating light from an axis passing through the point on the chart representing the radio station, a light pickup movable in the field of illumination of said source and receiving light from said field in accordance with the radial distance from said source, a photoelectric cell movable with the pickup and receiving light transmitted from the pickup to develop a control current varying in accordance with the intensity of light intercepted by the pickup, said pickup including a transparent rod of light conducting material having a direct pickup face adapted to receive light from said source by vertical illumination, a mask adapted to restrict the vertical illumination of said face to a predetermined angularity from the vertical, an inclined diffusion surface adapted to receive light within predetermined angles from the vertical beyond the effective range of said direct pickup face and transmit the received light through said rod and an inclined reflecting face operative to reflect light rays impinging on the pickup between the limit of angularity of reception of said diffusion surface and the horizontal.

8. In an automatic device for simulating radio range signals, a signal receiver, a signal generator adapted to sequentially transmit each of two positional signals to the receiver, a radio range chart having a radio range signal pattern thereon with the zones thereof having variable light reflecting properties, a single photoelectric cell scanning device movable over the surface of said chart and adapted to develop control currents in accordance with the intensity of light reflected from the area of the chart being scanned, a pair of vacuum tubes in circuit with said photoelectric cell and connected to said signal generator each being operative to control the volume and cutoff of one of said positional signals, said tubes being operative to permit the sequential transmission of each signal with equal volume upon said photoelectric cell being illuminated with an optimum value of reflected light and an increase in illumination above the optimum value causing an increase in volume of one of said signals and a decrease in the volume of the other signal, a decrease in illumination of the cell from the optimum value causing a contrary change in the relative signal volumes.

9. The structure as claimed in claim 8, in which additional volume control means are provided for said signal generator for varying the volume of both of the signals transmitted to said receiver, said last named volume control means being actuated in response to variation in the radial distance of said photoelectric cell scanning device from a radio range station point on said chart.

DANIEL R. BUTTERLY.

REFERENCES CITED

The following references are of record in the file of this patent:

UNITED STATES PATENTS

| Number | Name | Date |
|---|---|---|
| 2,070,178 | Pottenger | Feb. 9, 1937 |
| 2,165,236 | Dewan | July 11, 1939 |
| 2,243,600 | Hulst | May 27, 1941 |
| 2,326,764 | Crane | Aug. 17, 1943 |
| 2,352,216 | Melvin | June 27, 1944 |
| 2,358,793 | Crane | Sept. 26, 1944 |
| 2,366,603 | Dehmel | Jan. 2, 1945 |
| 2,389,359 | Grow | Nov. 20, 1945 |
| 2,406,751 | Emerson | Sept. 3, 1946 |
| 2,429,597 | Andrews | Oct. 28, 1947 |
| 2,444,477 | Stout | July 6, 1948 |
| 2,452,038 | Crane | Oct. 26, 1948 |
| 2,454,503 | Crane | Nov. 23, 1948 |